United States Patent [19]

Avedian et al.

[11] Patent Number: 4,532,030
[45] Date of Patent: Jul. 30, 1985

[54] APPARATUS AND METHOD FOR SEPARATING PRODUCE SUCH AS RAISINS

[75] Inventors: Aaron M. Avedian, Visalia; Verl A. Tyler, Reedley, both of Calif.

[73] Assignee: A & M Farms, Inc., Tulare, Calif.

[21] Appl. No.: 533,201

[22] Filed: Sep. 16, 1983

[51] Int. Cl.³ .............................................. B07B 13/00
[52] U.S. Cl. .......................................... 209/45; 209/2; 209/700; 198/605
[58] Field of Search ........................ 209/2, 3.1, 45, 46, 209/49, 693, 700, 47; 198/605

[56] References Cited

U.S. PATENT DOCUMENTS

| | | | |
|---|---|---|---|
| 448,198 | 3/1891 | Bisaner | 209/700 |
| 822,105 | 5/1906 | Eklund | 209/700 |
| 1,105,890 | 8/1914 | Day | 209/693 |
| 1,197,027 | 9/1916 | Hoel et al. | 209/693 |
| 1,711,817 | 5/1929 | Stoner | 209/700 |
| 2,071,908 | 2/1937 | Van Dyke | 209/693 |
| 2,291,447 | 7/1942 | Bierbrauer | 209/49 |
| 2,966,988 | 1/1961 | Nury et al. | 209/700 |
| 2,967,614 | 1/1961 | Nury et al. | 209/2 |
| 3,006,465 | 10/1961 | James | 209/45 |
| 3,757,945 | 9/1973 | Keiter | 209/693 X |
| 3,805,946 | 4/1974 | Yateman et al. | 198/605 |
| 3,880,274 | 4/1975 | Bechfloff et al. | 198/605 X |
| 4,258,851 | 3/1981 | Lion et al. | 209/700 |
| 4,267,930 | 5/1981 | Melkonian et al. | 209/3.1 |

Primary Examiner—Charles Hart
Attorney, Agent, or Firm—Workman, Nydegger & Jensen

[57] ABSTRACT

A novel apparatus and method for separating good raisins from moldy raisins. The apparatus comprises two conveyor belts which are rotatably mounted to a frame by suitable rollers. The belts are oriented so as to overlap one another slightly, and such that the overlapping portions exert a slight amount of pressure on the raisins as they pass through the overlapping portions. Both belts are simultaneously driven by a single motor so as to travel at the same speed.

In use, an untreated mixture of good and moldy raisins is deposited onto the lower belt so as to form a single layer. As the raisins pass through the overlapping portions of the upper belt and the lower belt, the moldy raisins adhere to one of the belts, and the good raisins drop downward from between the belts. The moldy raisins are thereafter scraped from the belts, and the moldy raisins and good raisins are separately collected and stored.

31 Claims, 5 Drawing Figures

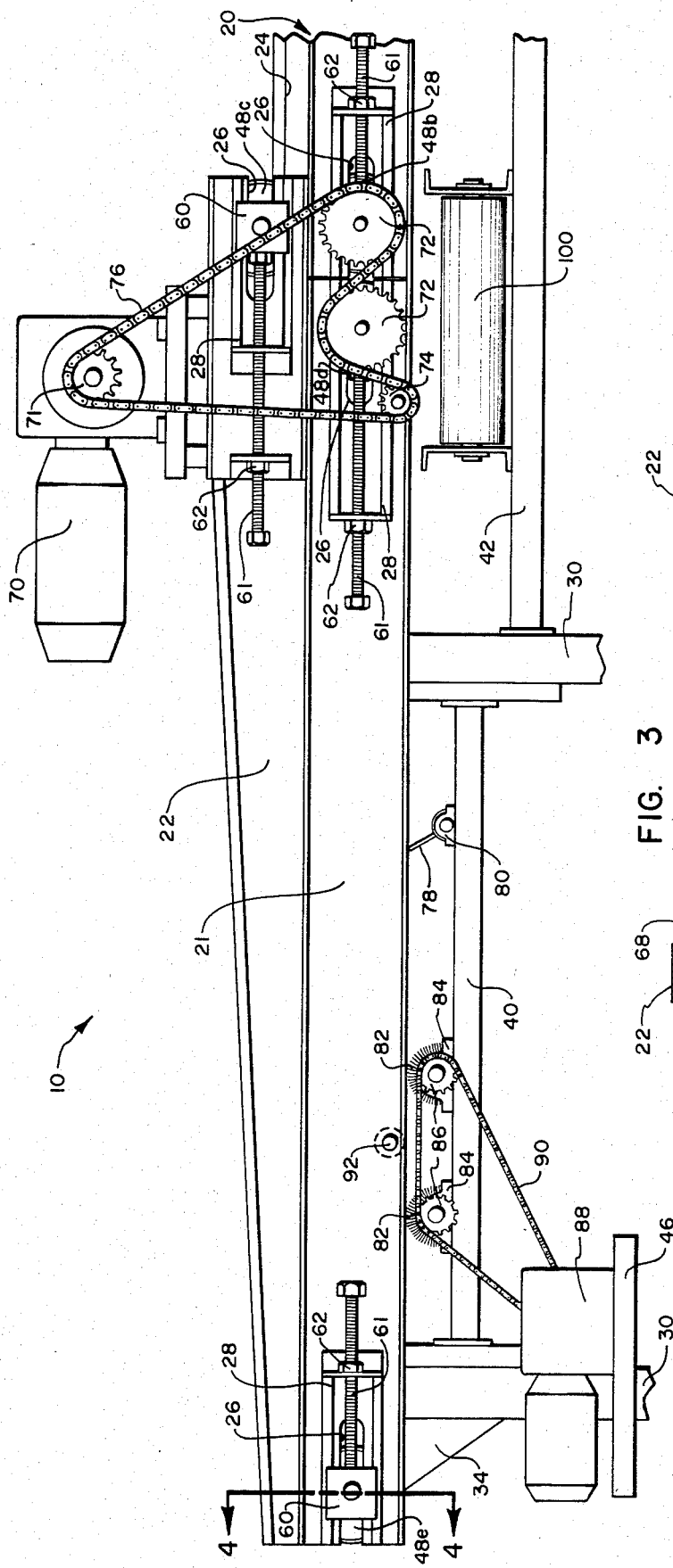
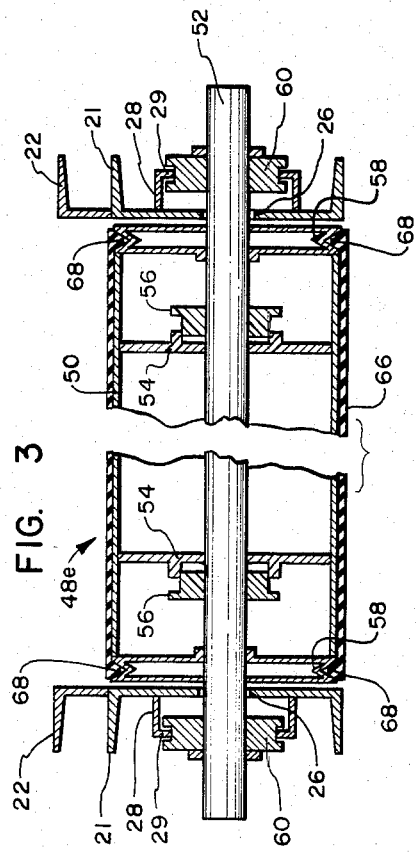
FIG. 3
FIG. 4

APPARATUS AND METHOD FOR SEPARATING PRODUCE SUCH AS RAISINS

BACKGROUND

1. The Field of the Invention

This invention relates to mechanical sorters and separators and, more particularly, to a novel apparatus and method for separating good raisins from moldy raisins.

2. The Prior Art

Various kinds of dried fruits are quite popular both as snack foods and as cooking ingredients. One of the most widely used dried fruits is the raisin, which is a dried, ripe, sweet grape. Raisins are presently used in a seemingly limitless variety of products, including commercial cereals and a large assortment of baked goods; and raisin growers, which are located in various parts of the country, invest substantial resources to provide the needed raisin supply.

In order to produce raisins, a raisin grower first raises sweet grapes until they are ripe. At such time, paper is generally spread on the ground between the rows of grapes; and the ripened grapes are thereafter picked and placed on the paper where they are allowed to dry in the sun. It usually takes several weeks for the grapes to dry properly; and, during this time, the grapes must be turned over regularly in order to prevent spoilage. Finally, after the grapes are properly dried, the raisins ae sorted and shipped to a packaging facility.

One of the major difficulties encountered by raisin growers is crop spoilage due to mold. Since, as described above, the raisins are typically dried in the sun, any precipitation or excessive humidity during the drying period significantly increases the risk that some of the raisins will become moldy. In fact, even if mechanical drying devices are used, the possibility of mold development still exists. It will be readily appreciated that if significant portions of the raisin crop become moldy, the crop will be significantly reduced in value.

In order to help minimize the effects of such raisin spoilage, those skilled in the art of raisin production have developed various devices and methods to separate good raisins from moldy raisins. Typically when using the prior art devices, the raisins are first treated in warm water and/or a peroxide solution. This treatment softens and partially decomposes the skin of each raisin. Importantly, since the moldy raisins decompose at a much faster rate than the good raisins, the moldy raisins quickly become very soft and sticky. In fact, as a result of the treatment, it is not uncommon for the moldy raisins to substantially decompose to the point where they become white and "musky." Although the good raisins are also somewhat decomposed, the good raisins, on the other hand, tend to maintain a relatively tough outer skin.

Following this preliminary treatment, the raisins are then placed into a separator device. Various different kinds of separator devices are currently in use, and these devices may be used either alone or in combination with each other.

One of the most common types of prior art device comprises a large bin, having screens at the sides and at the bottom thereof, and a large auger, which is rotated within the bin adjacent the screens. Because of their soft, mushy texture, the moldy raisins tend to stick to the screens at the sides and at the bottom of the bin. Thus, as the auger rotates, the moldy raisins are squashed through the screens and are thereafter collected and disposed of as feed or mesh. Often the bin of this device also serves to hold the water or peroxide which is used for treating the raisins prior to separation. Accordingly, the bin is often equipped with one or more large heating elements.

A second type of prior art device which is sometimes used together with the device described above comprises a laterally inclined conveyor belt which is rapidly agitated by a shaker mechanism. The pretreated mixture of good and moldy raisins is deposited onto one end of the belt. Then, as the belt is agitated, the good raisins are bounced down the belt and are collected at the bottom thereof. The moldy raisins, on the other hand, tend to stick to the belt, and they are thus carried to the top end of the belt where they are removed by a suitable water jet or scraper. Frequently, in order to increase the effectiveness of the device, this device includes a plurality of such belts which are arranged in parallel fashion.

A third type of prior art device comprises an inclined, rotating cylindrical screen. The rotating cylinder causes the raisins to be successively lifted and dropped as the raisins travel from one end of the cylinder to the other. The good raisins tumble freely toward the bottom end of the cylinder and are collected. The moldy raisins, however, stick to the sides of the cylinder and are thereafter washed into a collecting trough.

A fourth type of prior art device comprises two cylinders, each of which has a plurality of blunt rods affixed to the surface thereof. Importantly, the rods are staggered such that the rods on one cylinder mesh with the rods on the other cylinder, and the two cylinders are simultaneously rotated in opposite directions. The hydrogen peroxide treated mixture of good and moldy raisins is deposited between the two rotating cylinders such that each raisin is individually pressed by one of the rods. As a result, the moldy raisins stick to the rods and are thereafter scraped into a suitable container. The good raisins, however, do not stick to the rods but drop downward into a separate collecting bin.

Although the prior art type devices have been somewhat successful in minimizing the effects of raisin spoilage due to mold, these devices have been found to be inadequate in several respects. First, it is quite expensive to separate raisins using the prior art devices. For example, a substantial amount of energy may be required to heat the water which is used to pretreat the raisins. Similarly, considerable energy may be required to drive the large rotating augers or cylindrical screens of the prior art separator devices. In addition, since the raisins are pretreated in a solution of hydrogen peroxide, it is usually necessary to redry the good raisins after the separation process. Although such redrying is often done mechanically, it may be both time consuming and costly.

It has also been found that the prior art devices are not sufficiently effective in separating the raisins. For example, when using a separator which has rotating cylinders it is necessary to press each raisin twice, once from each side, in order to effect satisfactory separation. Also, as noted above, raisin growers often use two or more of the prior art devices together, in order to increase their effectiveness in accomplishing the desired separation of moldy raisins.

One of the most significant drawbacks of the prior art type devices is that many of the raisins are damaged during the separation process. As mentioned above, the pretreatment of the raisins accelerates the decomposition of both the good and the moldy raisins. As a result, many of the moldy raisins are reduced to a mere paste, and a substantial number of the good raisins are also affected. It will be readily appreciated that even a partial decomposition of the good raisins results in an overall lower quality raisin crop.

In addition to the damage caused by pretreatment, the vigorous action of the various prior art devices may further damage the raisins. For example, the squashing action of the rotating auger-type device may damage many good raisins along with the moldy raisins. Likewise, the dropping or bouncing action of the inclined belt and screen cylinder-type devices is also damaging; and the pressing action of the rods of the rotating cylinder-type device may crush and destroy many of the raisins. Consequently, using the prior art devices, most of the moldy raisins are only good for feed or mash. Moreover, the good raisins may not be suitable for all uses and may thus demand a much lower price.

Accordingly, it would be an improvement in the art to provide an apparatus for separating good raisins from moldy raisins which does not require pretreatment of the raisins to accelerate their decomposition. It would also be an improvement in the art to provide an apparatus and method for separating raisins which is energy efficient and which does not require that the raisins be redried following separation. Additionally, it would be an improvement in the art to provide an apparatus for separating good raisins from moldy raisins which effectively separates the raisins in a single treatment. Further, it would be an improvement in the art to provide an apparatus and method for separating raisins which preserves the quality of the raisins. Such an apparatus and method is disclosed and claimed herein.

BRIEF SUMMARY AND OBJECTS OF THE INVENTION

The present invention is directed to a novel apparatus and method for separating produce, as for example when separating good raisins from moldy raisins. The apparatus comprises two, large, resilient belts which are rotatably mounted to a frame by suitable rollers. The belts are oriented so as to overlap one another slightly, and such that the overlapping portion of the upper belt exerts a predetermined amount of pressure on the lower belt. Both belts are simultaneously driven by a single motor so as to travel in opposite directions at the same speed.

In use, an untreated mixture of good and moldy raisins is deposited onto the lower belt so as to form a single layer. As the raisins pass between the upper belt and the lower belt, they are subjected to a predetermined amount of pressure. As a result, the moldy raisins adhere to one of the belts, and the good raisins drop downward from between the belts. The moldy raisins are thereafter scraped from the belts, and the moldy raisins and good raisins are separately collected and stored.

It is, therefore, a primary object of the present invention to provide an apparatus and method for separating produce, such as in the case of separating good raisins from moldy raisins.

It is also an object of the present invention to provide an apparatus for separating raisins which does not require that the raisins be pretreated in warm water or peroxide.

It is a further object of the present invention to provide an apparatus and method for separating raisins which substantially preserves both the good raisins and the moldy raisins intact.

Additionally, it is an object of the present invention to provide an apparatus and method for separating produce which is energy efficient.

It is a still further object of the present invention to provide an apparatus and method for separating good raisins from moldy raisins which effectively separates the raisins during a single treatment.

These and other objects and features of the present invention will become more fully apparent from the following description and appended claims, taken in conjunction with the accompanying drawings.

BRIEF DESCRIPTION OF THE DRAWINGS

FIG. 3 is a partial vertical cross-sectional view of the separator apparatus of the present invention particularly illustrating the means for driving the separator belts and brushes.

FIG. 4 is a vertical cross-sectional view taken along lines 4—4 of FIG. 3.

DETAILED DESCRIPTION OF THE PREFERRED EMBODIMENTS

It will be readily appreciated that the components of the present invention, as generally described and illustrated in the figures herein, could be arranged and designed in a wide variety of different configurations. Thus, the following more detailed description of the embodiment of the apparatus and method of the present invention, as represented in FIGS. 1–5, is not intended to limit the scope of the invention, as claimed, but is merely representative of one presently preferred embodiment of the invention.

Figure 1:
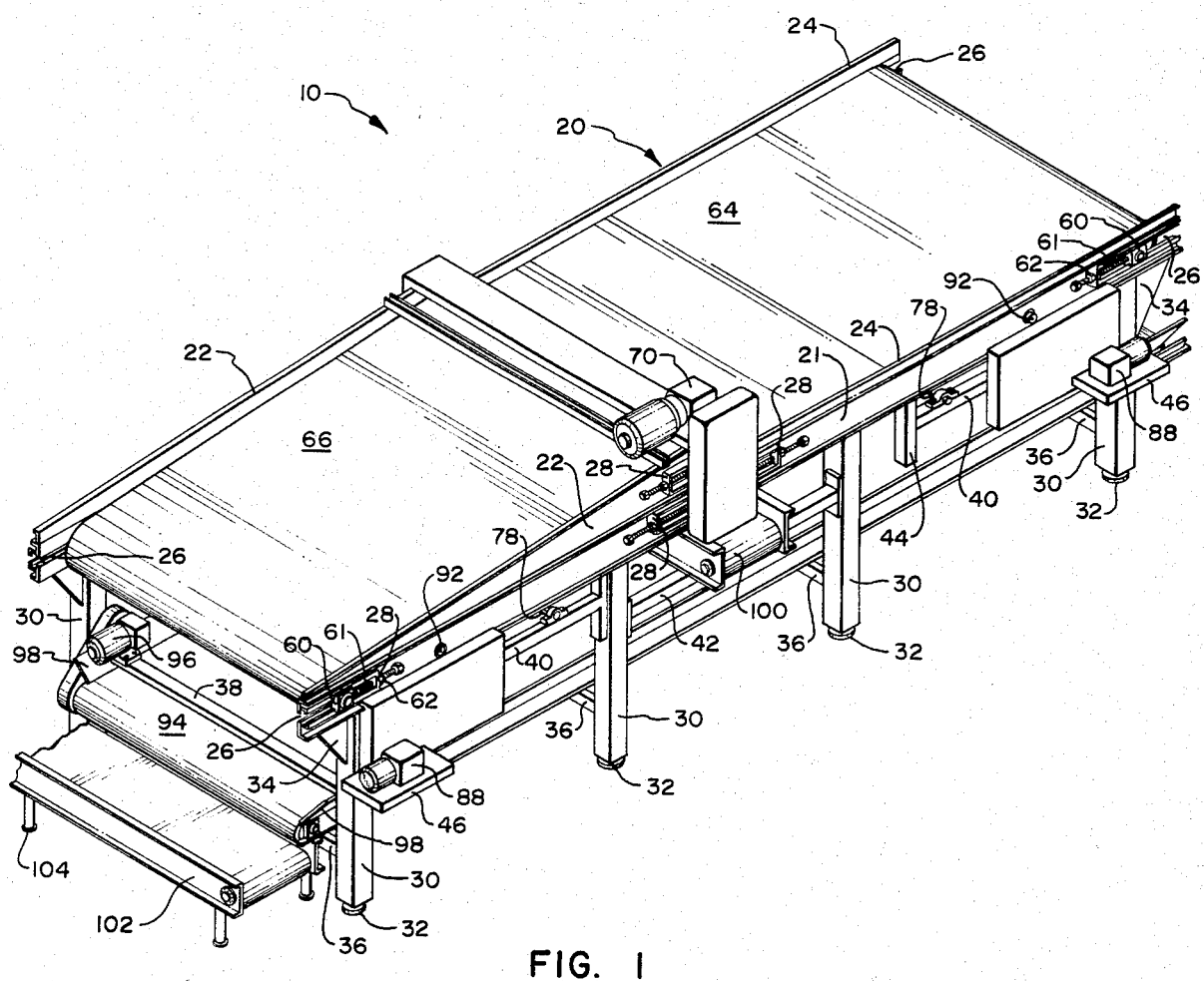
FIG. 1 is a perspective view of one presently preferred embodiment of the separator apparatus of the present invention.
Figure 2:
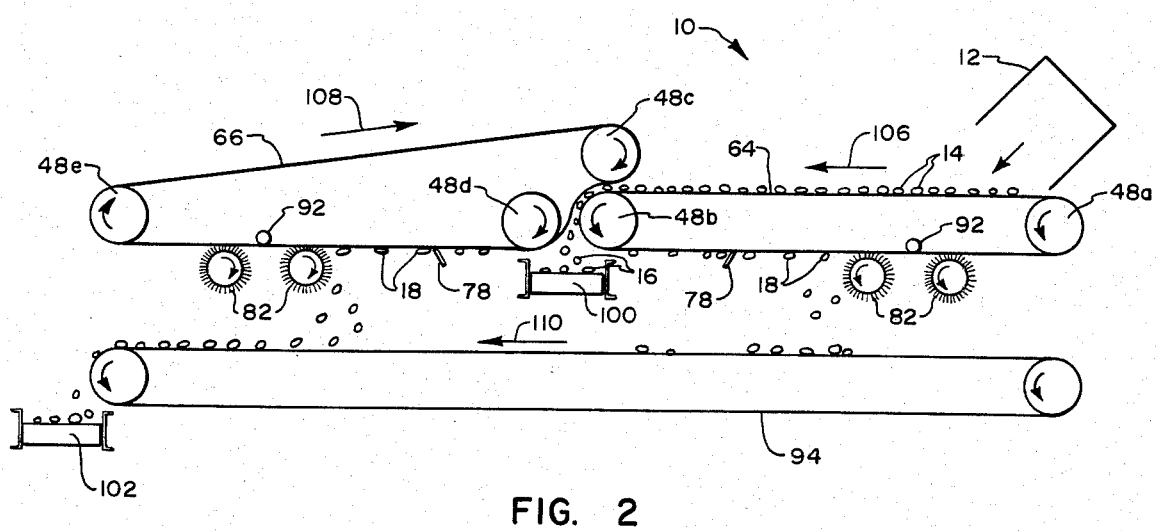
FIG. 2 is a schematic side elevational view of the separator apparatus.

The separator apparatus of the present invention, generally designated at 10, is shown in its entirety in FIG. 1. The apparatus 10 comprises two, overlapping, resilient separator belts 64 and 66 which are simultaneously driven in opposite directions by a suitable motor 70. Raisins or other produce is initially spread in a single layer on separator belt 64, and is then conveyed toward separator belt 66 so as to be pressed between the overlapping portions of belts 64 and 66. As depicted in FIG. 2, the moldy raisins 18 adhere to one of the separator belts 64 and 66 and are thereafter scraped off by brushes 82 onto conveyor belts 94 and 102 such that they may be appropriately collected. The good raisins do not adhere to either of the separator belts 64 or 66, but they drop onto conveyor belt 100 and are transported to a suitable storage bin.

All of the component parts of the present invention are mounted on a rigid frame structure 20. Frame 20 may have any suitable configuration, so long as it is capable of supporting the component parts of the apparatus 10 in their appropriate positions. For example, frame 20 may be a freestanding, table-like structure comprising two, parallel channel beams 21 and a plurality of vertical legs 30.

Each channel beam 21 has an elongated, wedge-shaped beam 22 secured to the top and adjacent one end portion thereof, as shown. Channel beams 21 are further provided with a rigid lip 24 which extends upwardly from the remaining portion of channel beams 21. In addition, channel beams 21 and wedge-shaped beams 22 are also provided with appropriate slots 26 to receive rollers, as schematically indicated at 48a–48e (FIG. 2). A mounting 28 is provided adjacent each slot 26, for purposes which will become more readily apparent from the discussion which follows.

A plurality of legs 30 extend vertically downward from each channel beam 21. Legs 30 may each be provided with adjustable feet 32 in order to facilitate leveling the apparatus 10. Also, legs 30 and channel beams 21 may be connected by means of suitable gussets 34 in order to increase the structural stability of apparatus 10.

A plurality of crossbeams 36 and 38 extend between each pair of opposing legs 30, as shown. Crossbeams 36 and 38 thus help increase the stability of apparatus 10. In addition, as will be described more fully below, crossbeams 36 and 38 are also used to support various components of apparatus 10. Similar crossbeams (not shown) could likewise be provided between opposing channel beams 21 and wedge-shaped beams 22.

In addition, a plurality of support bars 40 and 42 are suspended from each side of the apparatus 10. Support bars 40 and 42, as will be described more fully below, help support some of the component parts of apparatus 10. Support bars 40 and 42 may be secured between adjacent legs 30, or support bars 40 and 42 may be suspended by means of suitable support arms 44.

An appropriate number of rollers, collectively designated 48, are mounted to frame 20. For example, one presently preferred embodiment of the apparatus 10 comprises five rollers 48, as depicted in FIGS. 1–3. Roller 48a is mounted adjacent one end of frame 20; roller 48b is mounted adjacent the center of frame 20; roller 48c is mounted directly above roller 48b; roller 48d is mounted beside roller 48b such that the axes of rollers 48a, 48b, and 48d are substantially coplanar; and roller 48e is mounted adjacent the opposite end of frame 20.

The particular construction of rollers 48 is shown best in FIG. 4. Rollers 48 comprise a rigid, open-ended cylinder 50 having a coaxial shaft 52 secured therein. Both cylinder 50 and shaft 52 may be formed of any suitable material. For example, cylinder 50 may be formed of wood or aluminum, while shaft 52 is formed of steel. Shaft 52 is secured within cylinder 50 by means of bushings 54 and hubs 56. In addition, a V-belt sheave 58 is mounted on shaft 52 adjacent each end of cylinder 50, such that rollers 48 are substantially closed, hollow cylindrical members.

The ends of shaft 52 extend through slots 26 in channel beams 21, and a take-up bearing 60 is mounted on each end of shaft 52 and is slidably secured by lips 29 of respective mountings 28. As shown best in FIG. 3, adjustable bearings 60 have a threaded rod 61 extending therefrom through a threaded hole or fixed nut 62 in mounting 28. Thus, the position of bearings 60 may be adjusted by turning rod 61 in the appropriate direction, and adjustable bearings 60 may be used to adjust the tension in separator belts 64 and 66, as set forth more fully below.

Separator belts 64 and 66 are formed of a suitable resilient material. For example, separator belts 64 and 66 may be formed of a vulcanized rubber. As depicted in FIG. 4, separator belts 64 and 66 are guided around rollers 48 by means of V-belt sheaves 58. As illustrated, each belt 64 and 66 has a V-neck track structure 68 formed on or secured to the lateral edges thereof. Thus, track structures 68 are received in sheaves 58 such that belts 64 and 66 are properly guided around rollers 48 without any binding or lateral sliding.

As shown best in FIG. 2, lower separator belt 64 is maintained by rollers 48a and 48b such that it lies in a substantially horizontal plane. Upper separator belt 66 is maintained by rollers 48c, 48d, and 48e such that a portion of separator belt 66 overlaps and exerts pressure on an end portion of separator belt 64, as shown. Importantly, the tension between belts 64 and 66 may be predetermined by properly adjusting take-up bearings 60 of rollers 48b, 48c, and 48d.

In accordance with the structural description and explanation set forth above, it is possible to individually adjust the appropriate take-up bearings 60 of the apparatus 10 such that the desired tension between belts 64 and 66 is obtained. It will be readily appreciated, however, that it may sometimes be difficult to properly align rollers 48 with one another when bearings 60 are individually adjusted in such manner. For example, if the bearings 60 on each end of rollers 48b and 48d are individually adjusted, it is possible that rollers 48b and 48d will not be parallel to one another after the adjustment is made. Consequently, instead of obtaining a uniform tension between belts 64 and 66, as desired, the tension between belts 64 and 66 may vary somewhat across the width of belts 64 and 66. Similarly, after some of the bearings 60 have been individually adjusted, the rollers 48 may not be capable of properly carrying belts 64 and 66. For example, rollers 48a and 48b, which both carry belt 64, might not remain substantially parallel to one another; as a result, belt 64 might not be properly maintained around rollers 48a and 48b.

In order to avoid the above-described difficulties, it may be advantageous to provide some suitable means for adjusting the take-up bearings 60 on both ends of a given roller 48 simultaneously, or to provide a means for simultaneously adjusting the take-up bearings 60 on the ends of more than one roller 48. Such an adjusting means could have a number of different configurations. For example, a separate motor could be used to adjust each of the bearings 60. The motors could then be synchronized with one another such that the bearings 60 on opposite ends of a given roller 48 are simultaneously adjusted by substantially the same amount, thereby assuring that rollers 48 remain substantially parallel to one another.

Another suitable means for adjusting the bearings 60 so as to avoid the problems mentioned above is illustrated in FIG. 5. As shown, the rods 61 which are used to adjust each take-up bearing 60 may each be configurated as a worm gear. A short shaft 112 may then be rotatably mounted adjacent each rod 61 (such as, for example, by means of bearings 114), and a worm wheel 116 may be connected to one end of each shaft 112 so as to properly engage the worm gear surface of the adjacent rod 61. Each shaft 112 may then further be provided with a bevel gear 118 on the opposite end thereof.

A second shaft 120 may be rotatably mounted to frame 20 in some suitable manner so as to extend substantially perpendicularly across frame 20. For example, shaft 120 may be mounted to channel beams 21 by means of suitable bearings 122. As shown, each end of shaft 120 may further be provided with a bevel gear 124, and shaft 120 may be positioned such that bevel gears 124 on shaft 120 are drivingly engaged by bevel gears 118 on shafts 112.

Figure 5:
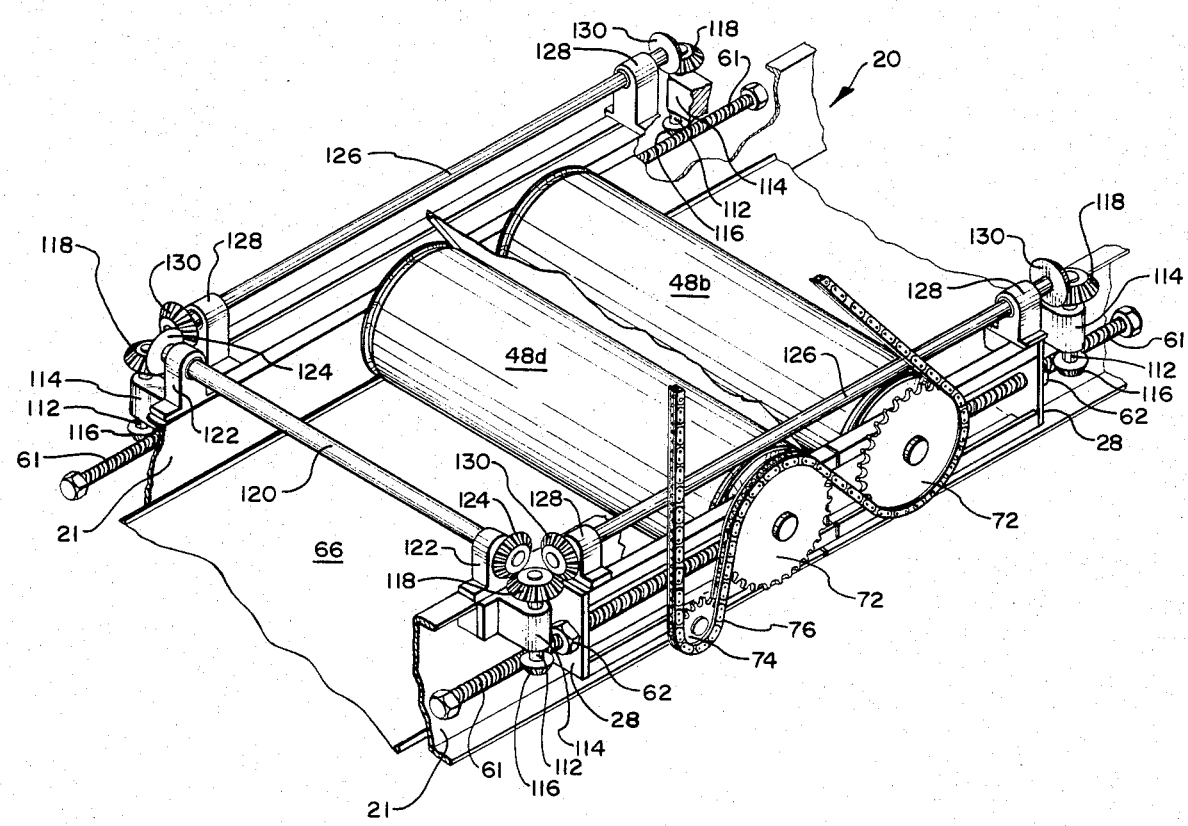
FIG. 5 is a perspective view illustrating one presently preferred embodiment of a means for adjusting the tension between the separator belts, portions of the separator apparatus being broken away so as to more fully illustrate the configuration of the adjusting means.

Thus, for example, when rods 112 and 120 are positioned as depicted in FIG. 5, the bearings on each end of roller 48d may be adjusted simultaneously by turning either of the rods 61 which are located adjacent the respective ends of roller 48d. It will be appreciated that when either such rod 61 is so rotated, the adjusting force will be transmitted by means of the shafts 112 and 120 to the rod 61 which adjusts the bearing on the opposite end of roller 48d. As a result, both ends of roller 48d may be adjusted simultaneously so as to keep roller 48d substantially parallel with the other rollers 48.

Although FIG. 5 depicts only one shaft 120, which is used to adjust roller 48d, it will be readily appreciated that a similar shaft 120 could be provided for roller 48b. Similarly, while the gearing mechanism is hereby specifically described and illustrated only in connection with rollers 48b and 48d, it will be appreciated that a similar gearing mechanism could be provided for each of the rollers 48, if desired.

As mentioned above, it may sometimes be advantageous to be able to adjust two or more rollers 48 simultaneously. Such is particularly the case with respect to rollers 48b and 48d, which provide the principal means for adjusting the tension between belts 64 and 66. Accordingly, as depicted in FIG. 5, a shaft 126 may be rotatably mounted to each side of frame 20 so as to extend between the shafts 112 adjacent respective ends of rollers 48b and 48d. For example, shafts 126 may be so mounted by means of bearings 128, as shown. In addition, each end of shafts 126 may be provided with a bevel gear 130, and each shaft 126 may be positioned such that its bevel gears 130 drivingly engage corresponding bevel gears 118 on shafts 112. Thus, it will be appreciated that rollers 48b and 48d can be simultaneously adjusted by rotating any single rod 61 which is located adjacent one of the ends of either of the rollers 48b or 48d. Significantly, in such case, both ends of each roller 48b and 48d will be adjusted by substantially the same amount, thus assuring that rollers 48b and 48d remain substantially parallel to one another.

The means for driving belts 64 and 66 is illustrated in FIG. 3. A motor 70 is mounted above rollers 48b, 48c, and 48d and is provided with a suitable sprocket wheel 71. Similar sprocket wheels 72 are provided on rollers 48b and 48d, and an idler sprocket wheel 74 is provided adjacent roller 48d, as shown. The several sprocket wheels are oriented so as to lie substantially in a single vertical plane, and a chain 76 is mounted on the sprocket wheels in the manner illustrated in FIG. 3. It will thus be appreciated that a counterclockwise rotation of sprocket wheel 71 will cause roller 48b to rotate in a counterclockwise direction and roller 48d to rotate in a clockwise direction, thereby driving belts 64 and 66, together with the associated rollers 48, in the directions indicated by the arrows 106 and 108 in FIG. 2.

Directly beneath belts 64 and 66 is a mechanism for cleaning the belts and removing the moldy raisins therefrom. This mechanism comprises a wire loop or scraper 78 and one or more brushes 82. Both wire loop 78 and brushes 82 are secured below the respective belt by means of support bars 40. For example, wire loop 78 may be secured to support bars 40 by means of a suitable clevis 80. Wire loop 78 is directed upwardly, as shown, such that it will contact the moldy raisins which have adhered to the belt, thereby causing them to drop.

For proper operation of the apparatus 10, it is important that belts 64 and 66 are maintained in a substantially clean, dry condition. Thus, apparatus 10 is also provided with brushes 82 below each belt 64 and 66. Brushes 82 may have any suitable configuration. For example, brushes 82 might be configured as long, linear scrub brushes. However, in order to increase the effectiveness of brushes 82, it is presently preferred that brushes 82 be substantially cylindrical in configuration and be rotatably mounted beneath belts 64 and 66.

Accordingly, brushes 82 may be secured to support bars 40 by means of suitable bearings 84. Further, sprocket wheels 86 may be provided on one end of brushes 82, and brushes 82 may be rotated mechanically by means of motor 88 and chain 90. As depicted in FIG. 2, brushes 82 should be rotated such that they brush against the direction in which respective belt 64 or 66 is moving. In order to further increase the effectiveness of brushes 82, an idler roller 92 may be positioned above each belt 64 and 66 so as to lie between brushes 82, as shown. Idler roller 92 thus prevents belts 64 and 66 from hopping on top of brushes 82 and maintains substantially continuous contact between belts 64 and 66 and respective brushes 82.

A suitable means is positioned beneath belts 64 and 66 so as to separately collect the good raisins and the moldy raisins which have passed through raisin separator 10. For example, as illustrated in FIGS. 1 and 2, this means may comprise conveyors 94, 100, and 102.

Conveyor 94 is positioned beneath belts 64 and 66 so as to extend substantially the entire length of frame 20. For example, conveyor 94 may be suspended below separator belts 64 and 66 by means of crossbeams 36. Conveyor 94 has a substantially horizontal orientation and may be constructed in substantially the same manner as belts 64 and 66. Also, conveyor 94 may be propelled by any suitable means, such as, for example, by a motor 96 which is mounted on crossbeam 38. Importantly, motor 96 drives conveyor 94 such that the upward surface of conveyor 94 travels toward conveyor 102, as will be discussed more fully below. Advantageously, two deflection plates 98 may be provided adjacent the longitudinal edges of conveyor 94 in order to assist in catching all the raisins which drop from separator belts 64 and 66.

Conveyor 100 is suspended directly beneath rollers 48b and 48d, as shown best in FIG. 2. Conveyor 100 may, for example, be thus suspended by means of support bars 42, and it may be propelled by a number of suitable means which are known in the art.

Conveyor 102 is located adjacent one end of conveyor 94 and is positioned so as to collect the moldy raisins 18 from conveyor 94. For example, as depicted in FIG. 1, conveyor 102 may be so positioned by means of suitable legs 104. Conveyor 102 may likewise be propelled by a number of suitable means which are known in the art.

The operation of the apparatus of the present invention is best understood by reference to FIG. 2. A mixture 14 of good and moldy raisins is placed onto lower separator belt 64 so as to form a single layer. This may be readily accomplished by means of a conventional shaker apparatus, as schematically indicated at 12. Raisin mixture 14 is then moved along separator belt 64 in the direction of arrow 106. Then, as the raisins pass between belts 64 and 66, they are subjected to a predetermined amount of pressure. Importantly, it should be noted that belt 66 is formed of a resilient material, and it is thus capable of stretching in response to various raisin sizes. Thus, while passing between belts 64 and 66, the raisins are not subjected to forces which will damage the raisins.

Since the belts 64 and 66 overlap, as raisin mixture 14 passes between belts 64 and 66, they are subjected to a gently squeezing pressure over a relatively large surface area. The pressure must be gentle enough that it does not damage the raisins by causing them to crack or split the skins of the raisins. Even though the raisins are not pretreated in water or peroxide, the moldy raisins 18 will stick to the surface of one of the belts. The good raisins 16, on the other hand, will fall immediately downward onto conveyor 100 and be transported to a suitable storage bin. Moldy raisins 18 are then removed from belts 64 and 66 by means of wire loop 78 and brushes 82 so as to drop onto conveyor 94. Conveyor 94 thereafter transports moldy raisins 18 in the direction of arrow 110, and the raisins are deposited onto conveyor 102 and transported to a suitable storage container.

The apparatus 10 of the present invention may be formed in a wide variety of different configurations and of a number of suitable members. For example, frame 20 of raisin separator 10 may be formed substantially of steel, and belts 64, 66, 94, 100, and 102 may all be formed of a vulcanized rubber material. In addition, although raisin separator 10 has been herein described as a freestanding unit, it will be readily appreciated that raisin separator 10 could be formed as part of a building or warehouse. In such case, frame 20 may be partially formed of wood or cement.

It will also be readily appreciated that a number of variations could be made in the above-described embodiment without departing from the spirit or essential characteristics of the present invention. For example, although the embodiment described above has included conveyors 94, 100, and 102, different means of collecting and/or transporting the good and moldy raisins could be used. For example, three separate bins could be placed directly beneath conveyor belt 64 and 66 so as to separately collect the good raisins and the moldy raisins. In addition, different conveyor belt configurations could be used to transport the good raisins and the moldy raisins to the designated storage facilities.

Although the present invention has been generally described as comprising a single raisin separator apparatus, it will be readily appreciated that a plurality of raisin separators 10 could be positioned in parallel. In such case, conveyors 100 and 102 could be used to connect the various separator devices such that all of the raisin separators 10 would deposit the raisins into a central storage area.

From the above discussion, it will be appreciated that the present invention provides an apparatus and method for separating various types of produce, such as when separating good raisins from moldy raisins. Since pressure is applied to the raisins or other produce over a relatively large surface area, the present invention is capable of effecting separation using the natural difference in surface quality of such produce. Thus, for example, the present invention provides an apparatus for separating moldy raisins which does not require that the raisins be pretreated in warm water or peroxide. As a result, the present invention does not necessitate redrying the raisins after separation. The present invention is therefore much more energy efficient than the apparatus and methods of the prior art.

Moreover, since the produce is not dropped or bounced in order to effect the desired separation, and since there is some "give" between the two belts which apply the pressure to the produce, it will be appreciated that the present invention provides an apparatus and method which does not damage the produce as it is separated. Further, since the produce is individually, simultaneously pressed from both sides, the present invention effectively separates the produce during a single pass through the belts 64 and 66 without having to turn the produce over.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by U.S. Letters Patent is:

1. An apparatus for separating moldy fruit from non-moldy fruit, comprising:
   a first conveyor belt to which moldy fruit will substantially adhere and to which non-moldy fruit will not substantially adhere when a gentle pressure is applied;
   a second conveyor belt to which moldy fruit will substantially adhere and to which non-moldy fruit will not substantially adhere when a gentle pressure is applied;
   means for supporting the first conveyor belt and the second conveyor belt such that a portion of the first conveyor belt overlaps and is positioned in close proximity to a portion of the second conveyor belt, said overlapping portions of the first and second conveyor belts being positioned so as to be capable of exerting a gentle pressure on fruit which passes between said overlapping portions such that the moldy fruit will substantially adhere to either the first conveyor belt or the second conveyor belt;
   means for propelling the first and second conveyor belts such that said overlapping portions of the first and second conveyor belts are propelled in substantially the same direction at substantially the same speed;
   means for receiving non-moldy fruit which does not adhere to either the first conveyor belt or the second conveyor belt after passing between said overlapping portions; and
   means for removing moldy fruit from the first and second conveyor belts after said moldy fruit passes between said overlapping portions.

2. An apparatus as defined in claim 1 wherein the first conveyor belt and the second conveyor belt are fabricated of a resilient material.

3. An apparatus as defined in claim 1 wherein the first conveyor belt and the second conveyor belt are fabricated of vulcanized rubber.

4. An apparatus as defined in claim 1 wherein the first conveyor belt and the second conveyor belt are each configured as an endless loop.

5. An apparatus as defined in claim 1 wherein said means for supporting said first and second conveyor belts comprises a frame having a plurality of rollers attached thereto.

6. An apparatus as defined in claim 5 wherein said means for supporting said first and second conveyor belts further comprises means for adjusting the position of at least one said roller so as to adjust the pressure exerted on said fruit by said first and second conveyor belts.

7. An apparatus as defined in claim 6 wherein each said roller has two ends and wherein said adjusting means comprises means for simultaneously adjusting the position of both ends of at least one said roller.

8. An apparatus as defined in claim 1 wherein said non-moldy fruit receiving means comprises a third conveyor belt mounted below said overlapping portions of said first and second conveyor belts.

9. An apparatus as defined in claim 8 further comprising a fourth conveyor belt for receiving the moldy fruit removed from the first and second conveyor belts, said fourth conveyor belt being mounted below said first, second, and third conveyor belts.

10. An apparatus as defined in claim 9 further comprising a fifth conveyor belt positioned at one end of said fourth conveyor belt.

11. An apparatus as defined in claim 1 wherein said first and second conveyor belts are supported such that one end of said first conveyor belt overlaps a portion of one end of said second conveyor belt.

12. An apparatus for separating moldy raisins from non-moldy raisins, comprising:
a lower conveyor belt to which moldy raisins will substantially adhere and to which non-moldy raisins will not substantially adhere when a gentle pressure is applied, said lower conveyor belt being configured as a continuous loop;
an upper conveyor belt to which moldy raisins will substantially adhere and to which non-moldy raisins will not substantially adhere when a gentle pressure is applied, said upper conveyor belt being configured as a continuous loop;
a plurality of roller means for suspending the opposite ends of said upper and lower conveyor belts such that a portion of one end of said upper conveyor belt overlaps and is positioned in close proximity to a portion of one end of said lower conveyor belt, said overlapping ends of the first and second conveyor belts being positioned so as to be capable of exerting a gentle pressure on raisins which pass between said overlapping ends such that the moldy raisins will substantially adhere to either the first conveyor belt or the second conveyor belt;
means for simultaneously propelling the lower conveyor belt and the upper conveyor belt such that the overlapping ends of said upper and lower conveyor belts are propelled in substantially the same direction at substantially the same speed;
first means positioned below the overlapping ends of said upper and lower conveyor belts for collecting the non-moldy raisins; and
second means positioned below said upper and lower conveyor belts for collecting the moldy raisins.

13. An apparatus for separating moldy raisins from non-moldy raisins as defined in claim 12 wherein said upper and lower conveyor belts are fabricated of a resilient material.

14. An apparatus for separating moldy raisins from non-moldy raisins as defined in claim 13 wherein said resilient material is vulcanized rubber.

15. An apparatus for separating moldy raisins from non-moldy raisins as defined in claim 12 further comprising a frame for supporting each said roller means.

16. An apparatus for separating moldy raisins from non-moldy raisins as defined in claim 12 further comprising means for adjusting at least one said roller means so as to adjust the pressure exerted between said upper and lower conveyor belts at the overlapping ends thereof.

17. An apparatus for separating moldy raisins from non-moldy raisins as defined in claim 16 wherein said means for adjusting pressure comprises a take-up bearing attached to at least one of said roller means at the overlapping ends of said upper and lower conveyor belts.

18. An apparatus for separating moldy raisins from non-moldy raisins as defined in claim 16 wherein each said roller means has two ends and wherein said adjusting means comprises means for simultaneously adjusting the position of both ends of at least one said roller means.

19. An apparatus for separating moldy raisins from non-moldy raisins as defined in claim 18 wherein said adjusting means further comprises means for simultaneously adjusting the position of at least two said roller means.

20. An apparatus for separating moldy raisins from non-moldy raisins as defined in claim 16 wherein each said roller means has two ends and wherein said adjusting means comprises a gearing mechanism which drivingly engages both ends of at least one said roller means such that both ends of the one said roller means can be adjusted simultaneously.

21. An apparatus for separating moldy raisins from non-moldy raisins as defined in claim 20 wherein said gearing mechanism drivingly engages both ends of at least two said roller means such that the two said roller means can be simultaneously adjusted so as to maintain the two said roller means substantially parallel to one another.

22. An apparatus for separating moldy raisins from non-moldy raisins as defined in claim 12 wherein said upper and lower conveyor belts each comprise a continuous V-belt track structure on an inward surface thereof and wherein each said roller means comprises a V-belt sheave which engages said V-belt track structure, thereby maintaining said upper and lower conveyor belts in alignment with each said roller means.

23. An apparatus for separating moldy raisins from non-moldy raisins as defined in claim 12 wherein said second means comprises means for scraping the moldy raisins off the underside of said upper and lower conveyor belts.

24. An apparatus for separating moldy raisins from non-moldy raisins as defined in claim 23 wherein said means for scraping comprises two brushes, one brush being positioned beneath each said conveyor belt.

25. An apparatus for separating moldy raisins from non-moldy raisins as defined in claim 24 wherein said brushes are substantially cylindrical in shape and are rotatably mounted to the frame, and said apparatus further comprising means for automatically rotating said brushes.

26. An apparatus for separating moldy raisins from non-moldy raisins as defined in claim 23 wherein said second means further comprises a conveyor belt located beneath said upper and lower conveyor belts so as to catch the moldy raisins which are scraped off the underside of said upper and lower conveyor belts.

27. An apparatus for separating moldy raisins from non-moldy raisins as defined in claim 26 wherein said first means comprises a conveyor belt located beneath said overlapping ends of said upper and the lower conveyor belts so as to catch the good raisins which drop therefrom.

28. An apparatus for separating moldy raisins from non-moldy raisins as defined in claim 12 wherein said means for simultaneously propelling said upper and lower conveyor belts comprises:
- a first sprocket wheel attached to one of said roller means at the overlapping ends of said upper and lower conveyor belts;
- a second sprocket wheel attached to another of said roller means at the overlapping ends of said upper and lower conveyor belts;
- a chain which is received around each sprocket wheel; and
- a motor which drives the chain.

29. An apparatus for separating moldy raisins from non-moldy raisins, comprising:
- an upper conveyor belt to which moldy raisins will substantially adhere and to which non-moldy raisins will not substantially adhere when a gentle pressure is applied and a lower conveyor belt to which moldy raisins will substantially adhere and to which non-moldy raisins will not substantially adhere when a gentle pressure is applied, each said conveyor belt being configured as a continuous loop, and each said conveyor belt having on the inside surface thereof a pair of V-belt track structures, each said track structure being positioned adjacent a lateral edge of said conveyor belts;
- a plurality of roller means for supporting the opposite ends of said upper and lower conveyor belts such that a portion of the bottom of said upper conveyor belt overlaps and is in close proximity to a portion of the top of said lower conveyor belt such that, as a mixture of moldy and non-moldy raisins is transported between the overlapping portions of said upper and lower conveyor belts, the moldy raisins will stick either to the upper conveyor belt or to the lower conveyor belt such that they will be carried to the underside thereof for removal while the non-moldy raisins will pass between said overlapping portions and will drop off the lower conveyor belt without sticking to either the upper conveyor belt or the lower conveyor belt;
- each said roller means comprising a V-belt sheave for receiving a corresponding V-belt track structure of said upper and lower conveyor belts;
- a frame for supporting each said roller means;
- means, mounted to said frame, for propelling said upper and lower conveyor belts such that the overlapping portions thereof are propelled in substantially the same direction at substantially the same speed;
- a first conveyor belt for catching non-moldy raisins as they pass through said overlapping portions and drop off the end of said lower conveyor belt, said first conveyor belt being mounted to said frame under said overlapping portions of said upper and lower conveyor belts;
- a second conveyor belt for catching moldy raisins as they are scraped off the underside of said upper and lower conveyor belts, said second conveyor belt being mounted to said frame under said upper and lower conveyor belts; and
- means, mounted to said frame, for scraping said moldy raisins from the underside of said upper and lower conveyor belts.

30. A method for separating moldy raisins from non-moldy raisins, comprising the steps of:
- placing a mixture of moldy raisins and non-moldy raisins on a first conveyor belt to which moldy raisins will substantially adhere and to which non-moldy raisins will not substantially adhere when a gentle pressure is applied, said first conveyor belt being configured as an endless loop;
- positioning a second conveyor belt to which moldy raisins will substantially adhere and to which non-moldy raisins will not substantially adhere when a gentle pressure is applied such that a portion of said second conveyor belt overlaps a portion of said first conveyor belt and is in close proximity therewith, said second conveyor belt being configured as an endless loop;
- passing said mixture of moldy and non-moldy raisins through said overlapping portions of said first and second conveyor belts so that moldy raisins will be pressed between said overlapping portions and will stick to either the first conveyor belt or the second conveyor belt while the non-moldy raisins will continue to pass through said overlapping portions without sticking to either the first conveyor belt or the second conveyor belt; and
- collecting the non-moldy raisins after they pass through said overlapping portions of said first and second conveyor belts.

31. A method as defined in claim 30 further comprising the steps of:
- scraping the moldy raisins from the underside of said first and second conveyor belts; and
- collecting the moldy raisins as they are scraped from said first and second conveyor belts.

* * * * *

UNITED STATES PATENT AND TRADEMARK OFFICE
CERTIFICATE OF CORRECTION

PATENT NO. : 4,532,030
DATED : July 30, 1985
INVENTOR(S) : AARON M. AVEDIAN et al.

It is certified that error appears in the above-identified patent and that said Letters Patent is hereby corrected as shown below:

Column 1, line 28, "ae" should be --are--
Column 2, line 1, "mesh" should be --mash--
Column 6, line 3, "V-neck" should be --V-belt--

Signed and Sealed this

Twelfth Day of November 1985

[SEAL]

Attest:

DONALD J. QUIGG

*Attesting Officer*

*Commissioner of Patents and Trademarks*